United States Patent
Smith, Jr. et al.

(10) Patent No.: US 6,927,465 B2
(45) Date of Patent: Aug. 9, 2005

(54) COMPACT SENSING APPARATUS

(75) Inventors: Marshall E. Smith, Jr., Eaton, FL (US); Richard W. Stettler, Winter Haven, FL (US); Peter U. Wolff, Winter Haven, FL (US)

(73) Assignee: Wolff Controls Corporation, Winter Haven, FL (US)

( * ) Notice: Subject to any disclaimer, the term of this patent is extended or adjusted under 35 U.S.C. 154(b) by 0 days.

(21) Appl. No.: 10/136,462

(22) Filed: May 1, 2002

(65) Prior Publication Data

US 2002/0163052 A1 Nov. 7, 2002

Related U.S. Application Data

(60) Provisional application No. 60/288,313, filed on May 2, 2001, provisional application No. 60/288,312, filed on May 2, 2001, provisional application No. 60/288,282, filed on May 2, 2001, provisional application No. 60/288,281, filed on May 2, 2001, provisional application No. 60/288,279, filed on May 2, 2001, provisional application No. 60/287,856, filed on May 1, 2001, and provisional application No. 60/287,763, filed on May 1, 2001.

(51) Int. Cl.[7] .......................... H01L 29/82; G01R 33/02
(52) U.S. Cl. ...................... 257/421; 257/414; 257/427; 324/252
(58) Field of Search ................................ 257/414, 421, 257/426–428; 438/67, 68, 64; 324/252; 325/252, 246

(56) References Cited

U.S. PATENT DOCUMENTS 5,476,820 A * 12/1995 Fueki et al. .................. 438/55
5,670,886 A * 9/1997 Wolff et al. ................. 324/644
6,002,252 A * 12/1999 Smith et al. ................ 324/252
6,187,609 B1 * 2/2001 Smith et al. .................. 438/64

* cited by examiner

Primary Examiner—Tom Thomas
Assistant Examiner—Matthew Landau
(74) Attorney, Agent, or Firm—Allen, Dyer, Doppelt, Milbrath & Gilchrist, P.A.

(57) ABSTRACT

A sensing apparatus having a sensor formed in a monolithic semiconductor substrate and oriented orthogonally to a signal conditioner is provided. The sensor generates a sensing signal in response to a predetermined physical stimulus. A signal conditioner electrically connected and responsive to the sensor conditions the sensing signal. The sensor and signal conditioner are formed on wafer surfaces of a single semiconductor substrate cut from a semiconductor wafer. The substrate is separated, one portion having the sensor formed on therein and the other having formed therein the signal conditioner. The portions are oriented and rejoined to form a monolithic semiconductor substrate. The resulting monolithic substrate has, then, a sensor and signal conditioner formed therein and angled relative to each other at a predetermined angle.

14 Claims, 5 Drawing Sheets

COMPACT SENSING APPARATUS

RELATED APPLICATIONS

This application claims priority to Provisional Application Ser. No. 60/288,313 filed May 2, 2001, and incorporates by reference the disclosures of Provisional Application Ser. No. 60/288,312 filed May 2, 2001, Provisional Application Ser. No. 60/288,282 filed May 2, 2001, Provisional Application Ser. No. 60/287,856 filed May 1, 2001, Provisional Application Ser. No. 60/287,763 filed May 1, 2001, Provisional Application Ser. No. 60/288,281 filed May 2, 2001, and Provisional Application Ser. No. 60/288,279 filed May 2, 2001.

FIELD OF THE INVENTION

The present invention relates to the field of sensing apparatuses and, more particularly, to the field of sensing apparatuses having a sensing element formed in a monolithic semiconductor substrate.

BACKGROUND OF THE INVENTION

Many different types of electrical and mechanical systems incorporate a sensing apparatus for detecting and measuring physical or chemical stimuli. Such sensing devices can be made to sense the presence and intensity of electrical or magnetic fields. Similarly, sensing apparatuses can be made to detect mechanical forces, measuring the temperature or flow of a liquid or gas, or register the acceleration of a solid body.

Over the years various types of sensing devices have been developed to accomplish these disparate tasks. The sensing apparatuses developed rely on a transducer or other sensing element having a specific preferred orientation in relation to the electrical or magnetic field or the a mechanical force to be sensed. Examples of electrical or magnetic field sensing elements are position and proximity sensors such as a Hall-effect cell, a magnetoresistor, a capacitive sensing element, and inductive sensing elements. An example of a mechanical force sensing element is a stress gauge that measures mechanical stress or weight of an object. Another example of a mechanical force sensing element is the accelerometer, which measures the acceleration of an object.

These sensing devices, then, typically have a preferred orientation for the sensing element relative to the electrical or magnetic field or to the physical force that is being sensed. The device thus must be oriented so that the sensing element has the preferred orientation if the sensor's sensitivity is to be optimized. There also may be extraneous electrical or magnetic fields or mechanical forces in the system with which the sensing device must accommodate, preferably by orienting the sensor relative to these extraneous fields or forces in a specific direction so as to reduce the sensor's sensitivity to the extraneous fields or forces. Such orientation can reduce sensing errors or noise caused by the movement of other objects or caused by the presence of other fields or forces within the vicinity of the sensing device.

Sensing apparatuses typically also rely on signal conditioning circuitry to amplify or otherwise condition the sensing signal that typically has too low a magnitude to overcome extraneous noise effects. The signal conditioning circuitry is also employed to condition a sensing signal that contains a large offset or other error signal that can overdrive sensitive monitoring equipment. Indeed, the signal conditioning circuitry can condition a sensing signal not otherwise conducive to transmission over an extended distance to a remotely located electrical device such a sensor monitoring circuit.

Thus, regardless of the specific nature of the stimulus to be sensed by a sensing apparatus, the device typically must include signal conditioning circuitry connected to a sensing element, which in turn, is positioned in a preferred orientation so as to maximize its sensing sensitivity.

Prior art sensing apparatuses typically are manufactured with the sensing element and the signal conditioning circuitry on a common-plane wafer, both which are interconnected via conductors (e.g., using metal or other conductive traces) formed on the same plane. These prior art devices typically are then installed in an electrical or a mechanical system with the sensing element oriented in a specific direction relative to the field being sensed. For a sensing apparatus having the sensing element and signal conditioner formed on a common-plane, then, the orientation also determines the orientation of the signal conditioner.

The amount of area occupied by the sensing element is ordinarily much smaller than the area required for the signal conditioning circuitry. Common-plane orientation of both the sensing element and the signal conditioning circuitry, therefore, generally produces a sensing apparatus having a larger cross section than could otherwise be achieved were the sensing element and the signal conditioner separately oriented in directions. This is an increasingly important consideration because sensing apparatuses are employed in electrical and mechanical systems that are increasingly smaller and thus require ever more compact sensing devices. In addition, the sensing apparatuses are increasingly tasked with ever more complicated functions, necessitating accordingly more complex circuitry. There is thus a need to reduce the size of sensing apparatuses by, for example, separately orienting the sensing element and the signal conditioning circuitry.

At the same time, though, the reduced size can not come at the expense of the structural integrity of the sensing apparatus because sensing devices typically are used in electrical and mechanical systems that are subject to harsh conditions such as extreme vibrations and accelerations, extreme temperature variations, exposure to harsh chemicals. Thus, while there is an ever greater need to reduce the overall size of the sensing apparatus, there is a corresponding need to maintain or enhance the structural integrity of the device.

SUMMARY OF THE INVENTION

With the foregoing in mind, the present invention advantageously provides a sensing apparatus the size of which is reduced by orienting the sensor and signal conditioner in separate planes while maintaining the overall structural integrity of the device. More specifically, the present invention provides a compact sensing apparatus having a sensor formed on a wafer surface of a semiconductor substrate and signal conditioning circuitry defining a signal conditioner formed on a wafer surface of the same semiconductor substrate. The substrate is formed by first separating and then rejoining the substrate so as to form a monolithic semiconductor substrate on which the sensor and signal conditioner are oriented relative to each other at the predetermined angle. With the sensor and the signal conditioner so oriented, the overall size of the sensing apparatus is advantageously reduced.

The sensor generates a sensing signal in response to a predetermined physical stimulus. The signal conditioner senses the sensing signal generated by the sensor in response to the predetermined physical stimulus. The physical stimulus can be an electric field, a magnetic field, or a mechanical force.

The single monolithic substrate on which the sensor and signal conditioner are formed can, itself, can be formed from a semiconductor wafer, which typically has been sliced from an ingot of semiconductor material. Each such slice of the semiconductor ingot forms a circular wafer having two opposing wafer surfaces. The sensor and the signal conditioner are first formed on the monolithic substrate. The substrate is then separated between a portion on which the sensor is formed and the portion on which the signal conditioner is formed thereby forming dual pieces, one having a sensor formed thereon and the other having a signal conditioner formed thereon. The separated portions of the substrate are oriented with respect to each other at the desired predetermined angle and then rejoined to form a single monolithic substrate having a sensor and signal conditioner oriented relative to each other at a predetermined angle. Thus, the sensor and the signal conditioner will be formed on the monolithic semiconductor substrate, being positioned substantially at the predetermined angle relative to each other.

Thus, in a first embodiment of the compact sensing apparatus, the sensor is formed on a first portion of a wafer surface of a single monolithic semiconductor substrate, and the signal conditioner is formed on a second portion of the same wafer surface of the substrate. The first and second portions of the wafer surface are then oriented with respect to each other at the predetermined angle to thereby substantially orient the sensor and the signal conditioner relative to each other at the predetermined angle. The preferred predetermined angle is such that the sensor and the signal conditioner are orthogonal to one another to thereby minimize the extent of the sensing apparatus.

The present invention also advantageously provides for electrically connecting the sensor to the signal conditioner using bonding pads. In the first embodiment of the present invention, a first plurality of bonding pads is positioned on the wafer surface of the monolithic substrate, and a second plurality of bonding pads is formed on an orthogonal, cut plane of the monolithic substrate. The cut plane results from cutting the substrate from a semiconductor wafer. The bonding pads formed on the cut plane are electrically connected to the sensor. The bonding pads formed on the wafer surface are connected to the signal conditioner. After the substrate is divided into two pieces—the sensor formed on one, the signal conditioner on the other—the piece are oriented relative to each other and rejoined. The wafer surface and the cut plane, specifically, are oriented to face each other, and the wire bonds pads are aligned together to thereby provide a conductive path between the sensor and the signal conditioner, which are thus oriented relative to each other at the predetermined angle. The corresponding bonding pads preferably are connected by a conductive epoxy or other thermosetting material.

In a further embodiment of the present invention, the sensing apparatus is formed by first positioning the sensor and the signal conditioner on opposing wafer surfaces of the same monolithic semiconductor substrate. Specifically, the sensor is formed on a portion of a wafer surface of a single monolithic semiconductor substrate and the signal conditioner is formed on a portion of the opposing wafer surface of the same substrate. Then, again, the monolithic semiconductor substrate is separated and the wafer surfaces are oriented with respect to each other to thereby substantially orient the sensor and the signal conditioner relative to each other at the predetermined angle. As with the previous embodiment, the predetermined angle can be any angle and, preferably, is one that limits the size of the sensing apparatus. The predetermined angle preferably, then, is about two hundred seventy (270) degrees to thereby orient the sensor substantially orthogonally relative to the signal conditioner and thus minimize the size of the sensing apparatus.

Thus, the sensor is positioned on a sensor substrate, and the signal conditioner is positioned on the signal conditioner substrate. As described above, the separate pieces having a sensor and signal conditioner, respectively, mounted thereon. In this further embodiment, the sensor and signal conditioner will have been formed on opposing wafer surfaces of the same monolithic substrate. The monolithic substrate is separated and then rejoined with the sensor and signal conditioner oriented relative to each other at the predetermined angle. A first plurality of bonding pads is formed on the wafer surface on which the signal conditioner is formed before the separation and rejoining of the substrate. Corresponding to each bonding pad, a recessed channel is also formed in the same wafer surface. When the monolithic semiconductor substrate is separated, the substrate is separated so as to divide each of the plurality of bonding pads formed on the wafer surface from the corresponding recessed channel formed in the wafer surface. Each corresponding recessed channel formed in the substrate thus appears on a cut plane resulting from separation of the substrate. Each channel is formed into a bonding pad.

The separated pieces are then oriented so that the sensor, again, is oriented orthogonally to the signal conditioner, and the pieces rejoined. More specifically, the cut plane on which bonding pads are formed is formed is positioned parallel to the wafer surface of the monolithic semiconductor substrate so that the corresponding bonding pads on the cut plane and wafer surface lie in the same plane. The bonding pads are aligned and the dual pieces are rejoined to form a monolithic substrate. Electrical conductors extend from the now-aligned bonding pads to the sensor and to the signal conditioner to thereby provide a conductive path between the sensor and the signal conditioner.

Thus, with respect to both the first and second embodiments, the compact sensing apparatus preferably includes at least one cut plane on which is formed at least one bonding pad and at least one electrical conductor for forming a conductive path between the sensor and the signal conditioner to thereby electrically connect the sensor and the signal conditioner. Once the bonding pads have been aligned and the separated pieces having been rejoined, a compact sensing apparatus comprising a monolithic substrate is formed.

In yet a further embodiment of the present invention, the compact sensing apparatus further includes a base support, an encapsulation, and electrical conducting means for connecting the sensing apparatus to a preselected external electrical device such as a remote sensing monitor. The base supports a sensor and signal conditioner formed, respectively, on a sensor substrate and a signal conditioner substrate 73. The substrates are abuttingly joined to form a monolithic substrate which is then mounted on the base. The sensor and the signal conditioner are electrically connected by bonding pads positioned on the sensor substrate and the signal conditioner substrate, the bonding pads being connected by a conductive epoxy or other thermosetting material as already described.

The encapsulation provides at least a partial protective covering by at least partially encasing the sensing apparatus.

Conducting means extend outwardly through the encapsulation connect the sensing apparatus to the remote electrical device. Preferably, the conducting means comprises at least one bonding pad positioned on the signal conditioner substrate and connected to at least one conductor to thereby provide a conductive path between the signal conditioner and the remote electrical device.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 1A is a perspective view of a sensing apparatus formed from dual pieces of a semiconductor substrate according to the present invention;

FIG. 1B is a perspective view of a sensing apparatus formed from dual pieces of a semiconductor substrate according to the present invention;

FIG. 1C is a perspective view of a sensing apparatus formed from dual pieces of a semiconductor substrate according to the present invention;

DETAILED DESCRIPTION OF PREFERRED EMBODIMENTS

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, the prime notation, if used, indicates similar elements in alternative embodiments.

Sensing Apparatus Formed from Two Pieces of a Single Monolithic Substrate

FIGS. 1A–1C illustrate a compact sensing apparatus 20 having a sensor 22 and signal conditioner circuit 24, the sensor 22 and the signal conditioner circuit 24 being formed from the same monolithic semiconductor substrate 26 and angled relative to one another at a predetermined angle, $\alpha$. The predetermined angle, $\alpha$, is defined as the angle of rotation between an imaginary initial plane extending substantially parallel to the signal conditioner and an imaginary terminal plane extending substantially parallel to the sensor. The predetermined angle can be any value greater than zero and up to three hundred sixty (360), but is preferably ninety (90) degrees. The sensor 22 serves to generate a sensing signal in response to a predetermined stimulus. The signal conditioner 24 is electrically connected to the sensor and conditions the signal generated by the sensor 22. The predetermined angle dictates the orientation of the sensor 22 relative to the stimulus it is to sense, while also determining the overall size of the sensing apparatus 20.

The single monolithic substrate 26 on which the sensor 22 and the signal conditioner 24 are formed can, itself, be formed from a semiconductor wafer. As will be readily understood by those familiar with the art, the semiconductor wafer will typically have been sliced from an ingot of semiconductor material. Each such slice of the semiconductor ingot forms a circular wafer having two opposing wafer surfaces parallel to the planes through which the ingot has been sliced and an annular edge connecting the opposing surfaces thereby forming the solid wafer.

According to the present invention, the monolithic substrate 26 preferably will have been formed by through the opposing surfaces of a semiconductor wafer, the cutting being along preselected dimensions dictated by the size of the sensor 22 and the signal conditioner 24 which are to be formed on the resulting substrate. So formed, the monolithic substrate 26 has two surfaces (portions of the opposing surfaces of the wafer from which the wafer has been cut), defining opposing wafer surfaces of the substrate. The sensor 22 and the signal conditioner 24 will be formed on a wafer surface of the monolithic substrate 26. According to the present invention, the sensor 22 and signal conditioner 24 are formed either on the same wafer surface of the substrate or on opposing wafer surfaces of the same substrate.

As illustrated in FIGS. 1A–1C, in order to orient the sensor 22 and the signal conditioner 24, the monolithic substrate is separated along the cut plane 21 between the portion of the substrate on which the sensor 22 is formed and the portion on which the signal conditioner 24 is formed, both the sensor 22 and the signal conditioner having been formed on the same wafer surface of the monolithic substrate 26. The then-separated portions of the substrate are oriented with respect to each other at the predetermined angle and rejoined to thereby form a monolithic substrate having formed thereon a sensor 22 and signal conditioner 24 positioned relative to each other at substantially the predetermined angle $\alpha$.

Thus, in a first embodiment of the compact sensing apparatus, the sensor is formed on a first portion of a wafer surface of a single monolithic semiconductor substrate 26, and the signal conditioner 24 is formed on a second portion of the same wafer surface of the substrate 26. The first and second portions of the wafer surface are then oriented with respect to each other at the predetermined angle to thereby substantially orient the sensor 22 and the signal conditioner 24 relative to each other at the predetermined angle. FIGS. 1A–1C illustrate the sensor 22 and the signal conditioner 24 being oriented orthogonally to each other. Other predetermined angles, however, are possible and will be preferred if balancing the benefits of enhanced sensor 22 sensitivity (dictated by the sensor's orientation to the physical stimulus to be sensed) and reduced sensing apparatus 20 size (determined by the orientation of the sensor 22 and the signal conditioner 24) dictates a preferred angle other than ninety (90) degrees.

Figures 2A, 2B, 2C:
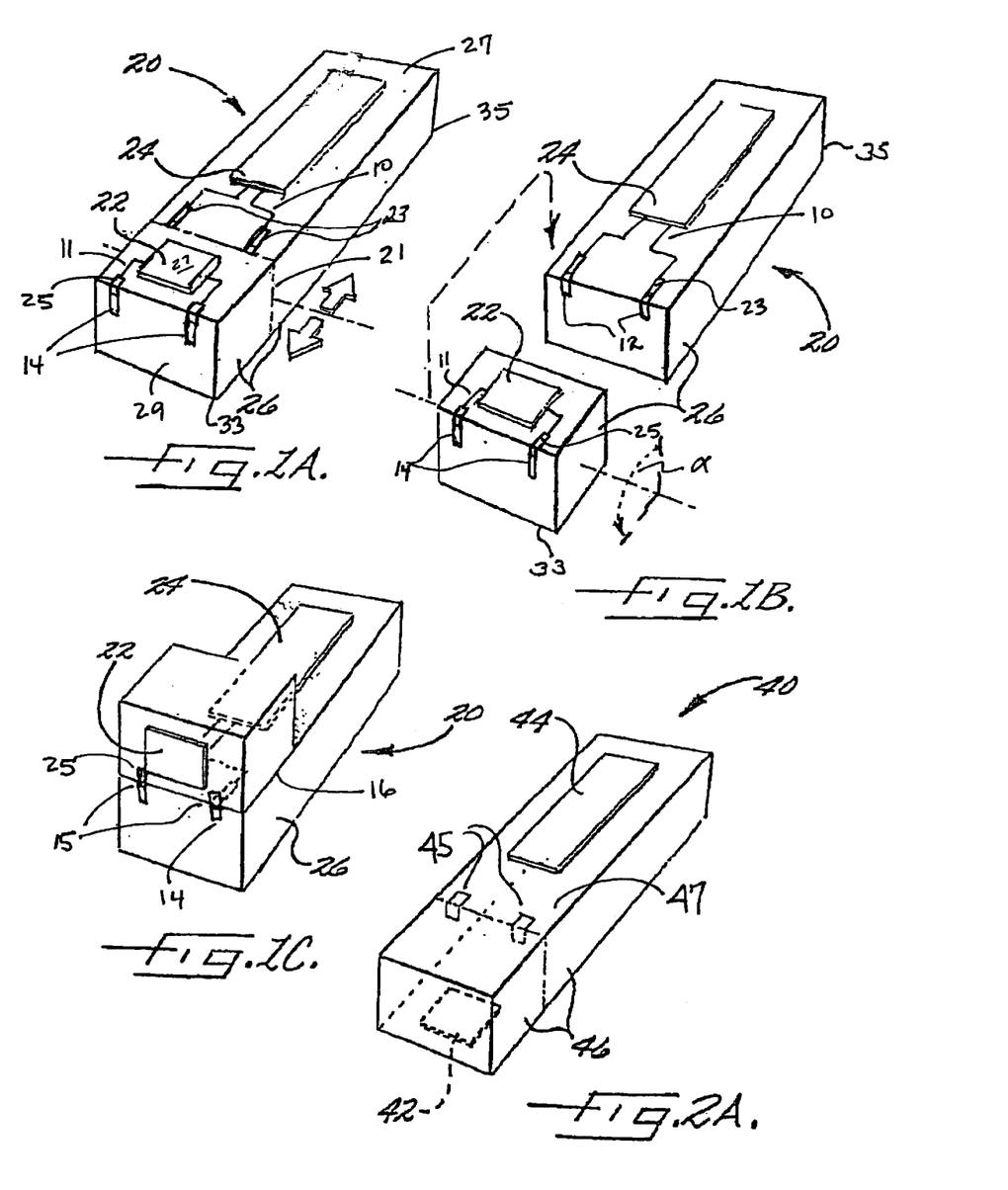
FIG. 2A is a perspective view of a sensing apparatus formed from dual pieces of a semiconductor substrate according to the present invention.
FIG. 2B is a perspective view of a sensing apparatus formed from dual pieces of a semiconductor substrate according to the present invention.
FIG. 2C is a perspective view of a sensing apparatus formed from dual pieces of a semiconductor substrate according to the present invention.
Figures 2B, 2C:
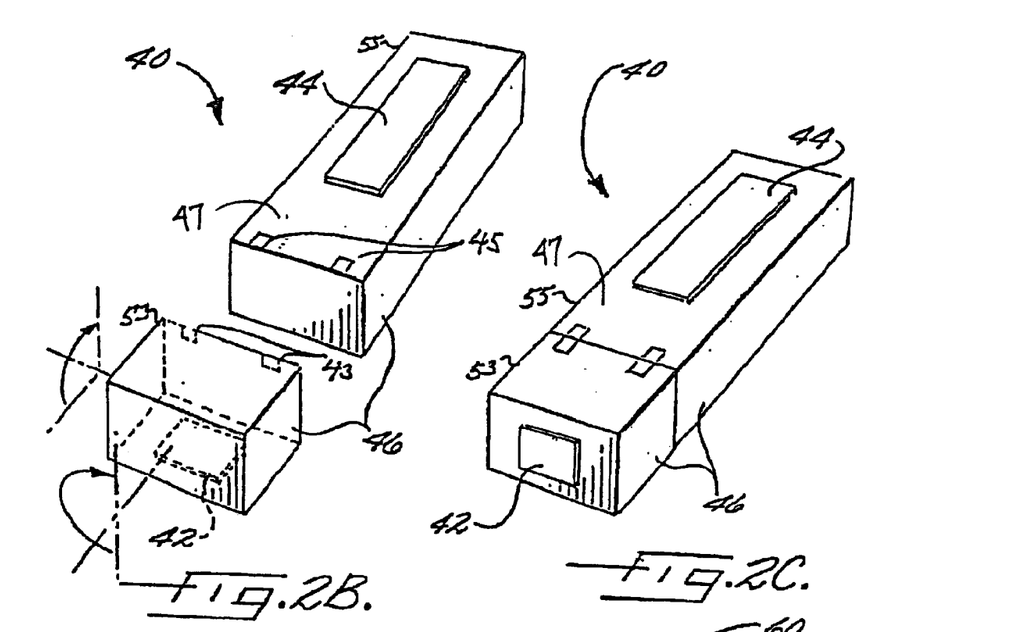

FIGS. 2A–2C illustrate a second embodiment of a sensing apparatus 40 in which the sensor 42 and the signal conditioner 44 are each formed on opposing wafer surfaces of the same monolithic semiconductor substrate. Specifically, the sensor 42 is formed on a portion of a wafer surface of a single monolithic semiconductor substrate and the signal conditioner 44 is formed on a portion of the opposing wafer surface of the same substrate. Then, again, the monolithic semiconductor substrate is separated and the wafer surfaces are oriented with respect to each other to thereby substantially orient the sensor 42 and the signal conditioner 44 relative to each other at the predetermined angle. As with respect to the first embodiment, the predetermined angle can be any angle and preferably is one that maximizes the overall efficiency of the sensing apparatus 40 by optimally balancing the benefit of angling the sensor 42 to achieve a specific sensing sensitivity against the benefit of angling the sensor 22 relative to the signal conditioner 24 to limit the overall size of the sensing apparatus 20.

FIGS. 1A–1C and 2A–2C also illustrate means for electrically connecting the sensor 22, 42 to the signal conditioner 24, 44 using bonding pads 23, 25 and 43, 45. In the first embodiment of the present invention, a first plurality of bonding pads 23 is positioned on the wafer surface 27 of the monolithic substrate 26 and a second plurality of bonding pads 25 is formed on an orthogonal, cut plane 29 of the monolithic substrate 26, the cut plane formed as a result of cuffing the substrate 26 from a semiconductor wafer. As will be readily understood by those familiar with the art, the bonding pads 23 formed on the wafer surface 27 will be electrically connected via conductors (e.g., metal traces) to the signal conditioner 24.

Similarly, the bonding pads 25 formed on the cut plane 29 will be electrically connected to the sensor 22 via conductors 11. (Efficient methods for forming the bonding pads and electrical conductors are described explicitly, below, in the context of the method aspects of the present invention.) As illustrated in FIG. 1C, the wafer surface 27 and the cut plane 29 are oriented to face each other, and the wire bonds pads 23, 25 are aligned together to thereby provide a conductive path between the sensor 22 and the signal conditioner 24. The corresponding bonding pads 23, 25 preferably are connected by a conductive epoxy or other thermosetting material.

FIGS. 2A–2C illustrate using a plurality of bonding pads 43, 45 as part of the second embodiment of a compact sensing apparatus 40. The sensor 42 is positioned on a sensor substrate, which as illustrated can be formed by separating the monolithic substrate 46 on which the sensor 42 is formed. The signal conditioner is positioned on a signal conditioner substrate, which also as illustrated, can be formed as a result of the separation of the monolithic substrate 46 between the sensor 42 and the signal conditioner 44. As illustrated, a first plurality of bonding pads 43 is formed on the wafer surface 47 of the monolithic semiconductor substrate 46. A recessed channel can be formed in the substrate 46 extending through the wafer surface 47 for forming a second plurality of bonding pads 45 therein on a cut plane that will result when the monolithic semiconductor substrate 46 is separated in order to orient the sensor 42 and the signal conditioner 44, each formed on opposing wafer surfaces of the monolithic semiconductor substrate 46. (Again, efficient methods for forming the bonding pads and electrical conductors are described, below, in the context of the method aspects of the present invention.)

The sensor 42, also again, is oriented orthogonally to the signal conditioner 44. As illustrated in FIGS. 2A–2C, the cut plane on which the second plurality of bonding pads 45 is formed is parallel to the wafer surface 47 of the monolithic semiconductor substrate 46 so that the corresponding bonding pads 43, 45 lie in the same plane. The bonding pads 43, 45 preferably are connected with wire bonds as will be understood by those familiar with the art.

Thus, with respect to both the first and second embodiments, the compact sensing apparatus 20, 40 preferably includes at least one cut plane on which is formed at least one bonding pad and at least one electrical conductor for forming a conductive path between the sensor and the signal conditioner to thereby electrically connect the sensor and the signal conditioner.

Both FIGS. 1A–1C and 2A–2C illustrate embodiments of the present invention in which the sensor 22, 42 and signal conditioner 24, 44 are formed on the same wafer surface or opposing wafer surfaces of the same monolithic substrate, and then oriented with respect to each other. More generally, a compact sensing apparatus according to the present invention comprises a monolithic substrate from which is formed a sensor substrate and a signal conditioner substrate, each having first and second surface portions and oriented at a preferred predetermined angle. Such a monolithic substrate having a sensor formed on the substrate and oriented orthogonally to a signal conditioner also formed on the substrate is illustrated in U.S. Pat. No. 5,670,886 to applicants and titled Method and apparatus for Sensing Proximity or Position of an Object Using Near-Field Effects as well as in Applicant's co-pending application titled Compact sensing Apparatus Having An Orthogonal Sensor and Methods For Forming Same, the disclosures of which are incorporated herein in their entirety.

More generally, then, a sensor 22, 42 can be formed on a first surface portion of the sensor substrate, and a signal conditioner 24, 44 formed on a second surface portion of the signal conditioner substrate. The first surface portions of the respective substrates are abuttingly connected to form a monolithic substrate having a sensor 22, 42 and a signal conditioner 42, 44 electrically connected to each other. More specifically, the first surface portion of the sensor substrate abuttingly connects to the first surface portion of the signal conditioner substrate such that the second surface portion of the sensor substrate and the second surface portion of the signal conditioner substrate are oriented with respect to each other at a predetermined angle greater than one hundred eighty (180) degrees. Preferably, the predetermined angle is ninety (90) degrees so as to thereby enhance compactness of the sensing apparatus. Again, the predetermined angle is here defined as the angle of rotation between an imaginary initial plane extending substantially parallel to the second surface portion of the signal conditioner substrate and an imaginary terminal plane extending substantially parallel to the second surface portion of the sensor substrate.

Epoxy Bound Sensor and Signal Conditioner

As illustrated in FIGS. 1A–1C and described above, the sensor 22 and the signal conditioner 24 are electrically connected via bonding pads 23, 25 fixedly connected with an epoxy 13 or other conductive thermosetting material. More specifically, the bonding pads 23 can comprise at least one recessed channel 12 formed in a surface of a substrate on which the signal conditioner 24 is formed, the substrate defining a signal conditioner substrate 35. Corresponding bonding pads 25 can comprise at least one recessed channel 14 formed on an orthogonal plane or other edge portion of the substrate on which the sensor 22 is formed, the substrate defining a sensor substrate 33. The bonding pads 23, 24 can be aligned when the separate portions of the substrate are rejoined to form a monolithic substrate on which the sensor 22 and signal conditioner 24 are formed and the epoxy 13 or other thermosetting material can be diffused into the corresponding at least one recessed channel 14 formed in the surface of the sensor substrate and into at the least one recessed channel 12 formed in the surface of the signal conditioner substrate to thereby form an adhesive layer mutually joining the respective substrates. The at least one channels 14 of the sensor substrate and the signal conditioner substrate, being adequately aligned, thereby provide a common channel electrically bridging the sensor substrate 33 and the signal conditioner substrate 35 to thereby provide a conductive path between the sensor 22 and the signal conditioner 24. In addition, the sensor substrate 33 and the signal conditioner substrate 35 can be abuttingly connected by mutual adhesion. The adhesion being effected, preferably, by a nonconductive thermosetting material positioned between the mutually abutting surface portions of the sensor substrate 33 and the signal conditioner substrate 35 to thereby form an adhesive layer mutually joined to the respective substrates.

Wire Bound Sensor and Signal Conditioner

As illustrated in FIGS. 1A–1C, 2A–2CU, and described above, the sensor 22, 42 and the signal conditioner 24, 44 can alternatively be electrically connected via wire bonds. More specifically, the bonding pads 23, 25, 43, and 45 can comprise wirebond pads. At least one wire bond pad 23, 43 is positioned on a surface of the substrate on which the signal conditioner 24, 44 is formed, the substrate defining a signal conditioner substrate 35, 55. At least one wirebond pad 25, 45 is positioned on an orthogonal plane or other edge portion of the substrate on which the sensor 22, 42 is formed, the substrate defining a sensor substrate 33, 53. Each at least one bonding pad 23, 25, 43, and 45 can be aligned when the sensor substrate 35, 53 and signal conditioner substrate 35, 55 are abuttingly joined to form a monolithic substrate on which the sensor 22, 42 and signal conditioner 24, 44 are formed. At least one wire conductor is then connected between the wirebond pads 23, 25, 43, and 45 to thereby provide a conductive path between the sensor 23, 42 and the signal conditioner 24, 44. In addition, the sensor substrate 33, 53 and the signal conditioner substrate 35, 55 are abuttingly connected by mutual adhesion, the adhesion preferably being effected by a nonconductive thermosetting material 16 positioned between the mutually abutting surface portions of the sensor substrate 33, 53 and the signal conditioner substrate 35, 55.

Figure 3:
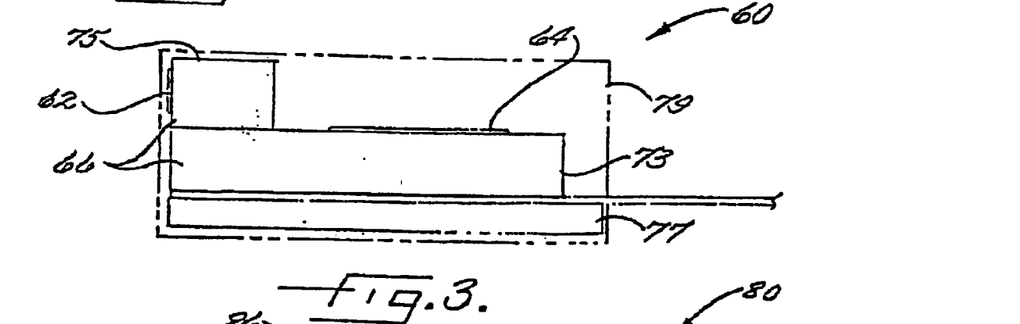
FIG. 3 is a side elevational view of a sensing apparatus according to the present invention.
Figure 4:
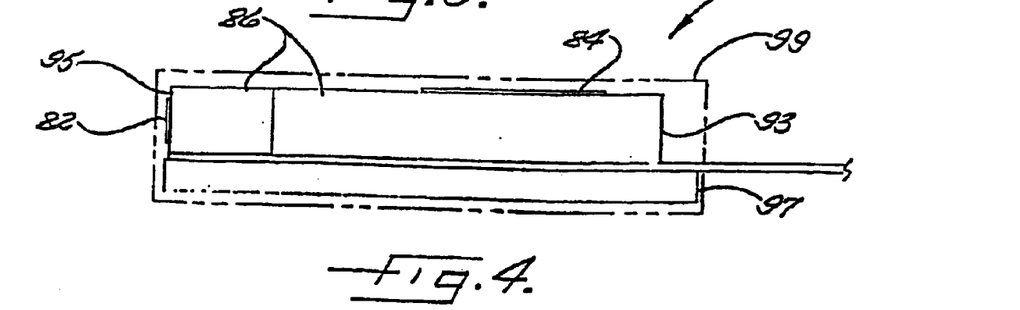
FIG. 4 is a side elevational view of a sensing apparatus according to the present invention.

FIGS. 3 and 4 illustrate third and fourth embodiments of the present invention in which the compact sensing apparatus further comprises a base, an encapsulation, and an electrical conducting means for connecting the sensing apparatus to a preselected external electrical device such as a remote sensing monitor. In FIG. 3, a sensing apparatus 60 is mounted on a base 77. The base 77 supports a sensor 62 and signal conditioner 64 formed, respectively, on a sensor substrate 75 and a signal conditioner substrate 73. The substrates are abuttingly joined to form a monolithic substrate 66. The sensor 62 and the signal conditioner 64 are electrically connected by bonding pads positioned on the sensor substrate 75 and the signal conditioner substrate 73, the bonding pads being connected by a conductive epoxy or other thermosetting material as already described.

The sensing apparatus 60, moreover, is at least partially encased by an encapsulation. As illustrated in FIG. 3, the encapsulation 79 encapsulates the base 77 and the monolithic substrate 66 formed from the joinder of the sensor substrate 75 and the signal conditioner substrate 73 on which are formed, respectively, the sensor 62 and the signal conditioner 64. Conducting means extending outwardly through the encapsulation 79 connect the sensing apparatus 60 to the remote electrical device. Preferably, the conducting means comprises at least one bonding pad 70 positioned on the signal conditioner substrate 73 and connected to at least one conductor 71 to thereby provide a conductive path between the signal conditioner 64 and the remote electrical device.

FIG. 4 illustrates a sensing apparatus 80 mounted on a base. The base 97 supports a sensor 82 and signal conditioner 84 formed, respectively, on a sensor substrate 95 and a signal conditioner substrate 93, the substrates abuttingly joined to form a monolithic substrate 66. The sensor 82 and the signal conditioner 84 are connected electrically by wire bonds connected to a plurality of wirebond pads formed on each of the sensor substrate 95 and the signal conditioner substrate 93. The sensing apparatus 80 is at least partially encased by an encapsulation 99. As illustrated in FIG. 4, the encapsulation 99 encapsulates the base 97 and the monolithic substrate 86 formed from the joinder of the sensor substrate 95 and the signal conditioner substrate 93 on which are formed, respectively, the sensor 62 and the signal conditioner 64. The sensing apparatus 80 is connected to a remote electrical device by conducting means extending outwardly through the encapsulation 99. The conducting means preferably comprises at least one bonding pad 90 positioned on the signal conditioner substrate 93 and connected to at least one conductor 91, providing therewith a conductive path between the signal conditioner 84 and a sensing monitor or other remote electrical device. An example of such conductor is a flexible ribbon cable encasing a plurality wire conductors.

Figure 5:
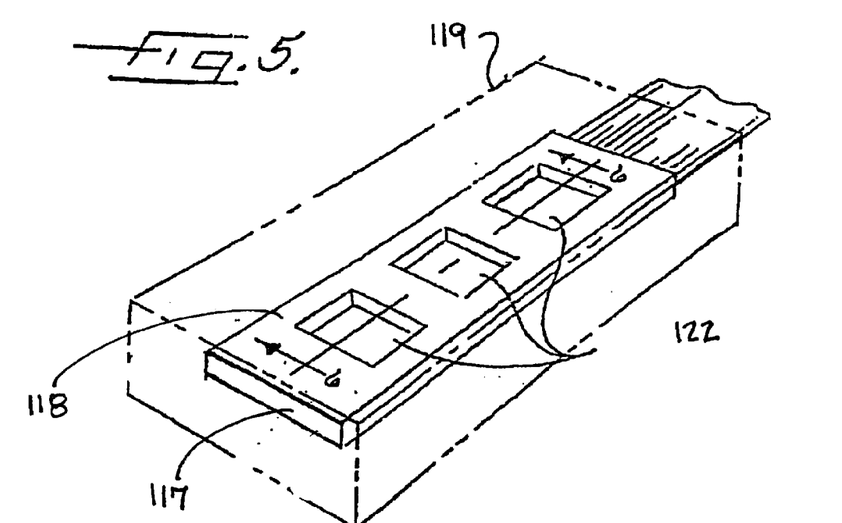
FIG. 5 is cross sectional view of the interface between a base portion and encapsulation of the sensing apparatus according to the present invention.
Figure 6:
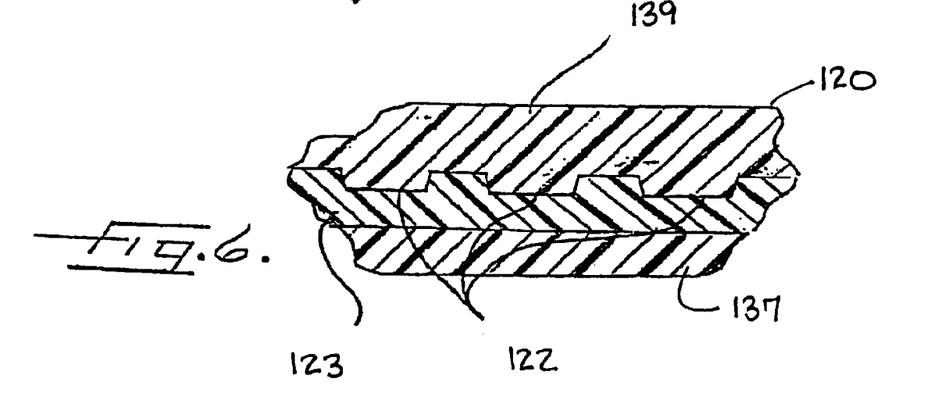
FIG. 6 is a perspective view of a sensing apparatus according to the present invention.

Yet a further embodiment of a sensing apparatus 100 is illustrated in FIG. 5 in which the base 117 further comprises a roughened surface portion 118 which contacts a portion of the encapsulation 119 to increase friction at points of contact between the base 117 and the encapsulation 119 to thereby reduce the probability that the base 117 and the encapsulation 119 will separate from each other when the sensing apparatus 100 is subject to unequal forces. For example, the roughened surface portion 118 of the base 117 contacting a portion of the encapsulation 119 can be an edge portion of the base 117 that, as illustrated, is serrated Moreover, as illustrated in FIG. 6, in a sixth embodiment of a sensing apparatus 120, the sensing apparatus 120 preferably comprises at least one recessed well 122 preferably formed within a bottom surface portion 123 of the base 137 to increase the extent of contact between the base 137 and the encapsulation 139 to thereby reduce the probability that the base 137 and the encapsulation 139 will separate from each other.

Forming a Monolithic Sensing Apparatus from Two Pieces of the Same Semiconductor Substrate FIGS. 1A–1C and 2A–2C also illustrate the method aspects of the present invention for forming a monolithic sensing apparatus formed from two pieces of the same monolithic semiconductor substrate. The method comprises forming both a sensor and conditioning circuitry defining a signal conditioner on the single monolithic substrate. The substrate preferably is composed of a semiconductor material such as silicon or other semiconductor material familiar to those skilled in the art. The monolithic substrate is formed by cutting a semiconductor wafer been sliced from an ingot composed of silicon or other semiconductor material. If the monolithic substrate is cut from a semiconductor wafer, the wafer preferably is cut so as to provide a monolithic substrate having two opposing surfaces corresponding to the opposing surfaces of the wafer from which the monolithic substrate is cut. These opposing surfaces of the monolithic semiconductor substrate, then, define wafer surfaces of the substrate.

Figure 7:
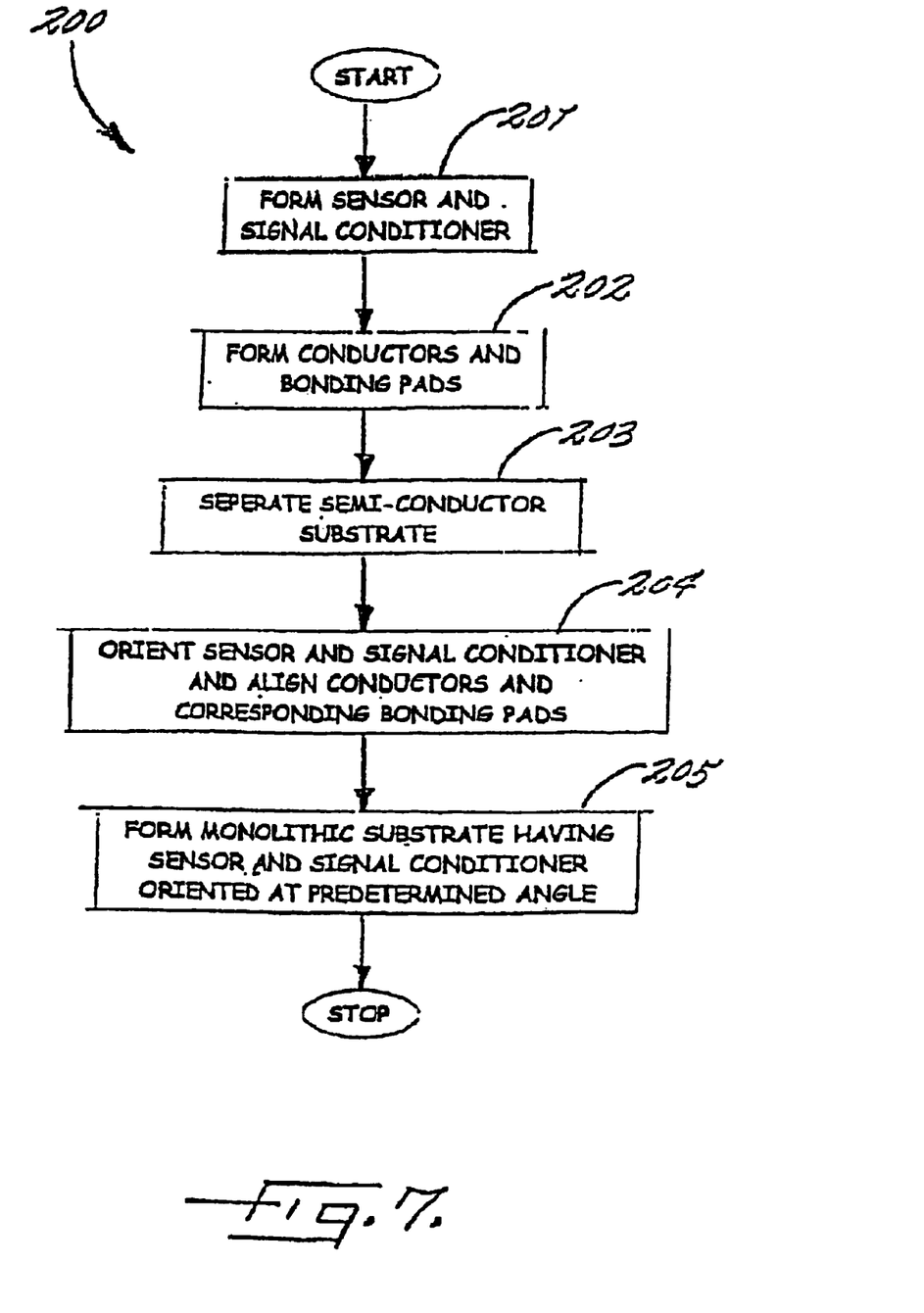
FIG. 7 is flow diagram of a method of forming a sensing apparatus according to the present invention.

FIG. 7 more explicitly illustrates the method aspects of the present invention for forming a compact sensing apparatus. According to a first method 200, the sensor and the signal conditioner are formed on the monolithic substrate (Block 201). More specifically, as illustrated in FIGS. 1A–1C, the sensor 22 and the signal conditioner 24 can be formed on the same wafer surface of the substrate 26. Alternatively, as perhaps best illustrated in FIGS. 2A–2C, the sensor 42 can be formed on an opposing wafer surface of the substrate 46 from the wafer surface 47 on which the signal conditioner 44 is formed. As further illustrated in FIG. 7, the method 200 also includes forming a plurality of bonding pads and conductors for forming a conductive path electrically connecting the sensor and the signal conditioner (Block 202). At least one conductor and bonding pad is formed on the wafer surface, while at least one conductor and bonding pad is formed on a cut plane formed orthogonally or at another predetermined angle relative to the wafer surface of the substrate. According this first method 200, then, the substrate on which the sensor and signal conditioner have been formed is separated (Block 203). The sensor and signal conditioner are then oriented relative to each other at the predetermined angle and the corresponding conductors and bonding pads formed on the wafer surface and cut plane are aligned (Block 204). In a final step of the method 200, the separate pieces on which the sensor and signal conditioner are formed are rejoined to thereby form a compact sensing apparatus comprising a monolithic substrate having a sensor and signal conditioner oriented at the predetermined angle (Block 205).

Thus, the method 200 for forming the sensing apparatus further comprises reorienting the sensor and the signal conditioner so that the sensor and the signal conditioner are positioned with respect to each other at a predetermined angle. If the predetermined angle is defined by the angle of rotation between an imaginary initial plane extending substantially parallel to the signal conditioner and an imaginary terminal place extending substantially parallel to the sensor, then the preferred predetermined angle is greater than predetermined angle is greater than one hundred eighty (180) degrees. Preferably, the predetermined angle is two hundred seventy (270) degrees so that the sensor and the signal conditioner.

According to method 200 illustrated by the steps shown in FIG. 7, in order to reorient the sensor and the signal conditioner to the predetermined angle, the monolithic substrate on which the sensor and the signal conditioner are formed is separated into two pieces, one on which the sensor is formed, defining a sensor substrate, and the other on which the signal conditioner is formed, defining a signal conditioner substrate. As described above and illustrated in FIGS. 1A–1C, the sensor 22 and signal conditioner 24 can be formed on a common wafer surface of the monolithic substrate. Alternatively, as described above and illustrated in FIGS. 2A–2C, the sensor 42 and signal conditioner 44 can be formed on opposing wafer surfaces prior to forming the two pieces. The method 200, as also described above, further comprises forming a path between the sensor and the signal conditioner with a plurality of bonding pads and electrical conductors (Block 202). Preferably, the conductive path will be formed after the monolithic substrate on which the sensor and signal conditioner are formed has been separated into two pieces defining, respectively, the sensor and the signal conditioner, and having the sensor formed on the sensor substrate and the signal conditioner being formed on the signal conditioner substrate.

In order to facilitate forming the conductive path between the sensor and the signal conditioner, at least one electrical conductor is preferably formed on a cut plane of the sensor substrate for providing the electrically conductive path between the sensor and the signal conditioner. Forming the electrical conductor on the cut plane permits the sensor to be positioned at any angle, including orthogonally, relative to the signal conditioner and the surface on which the signal conditioner is formed.

Figure 8:
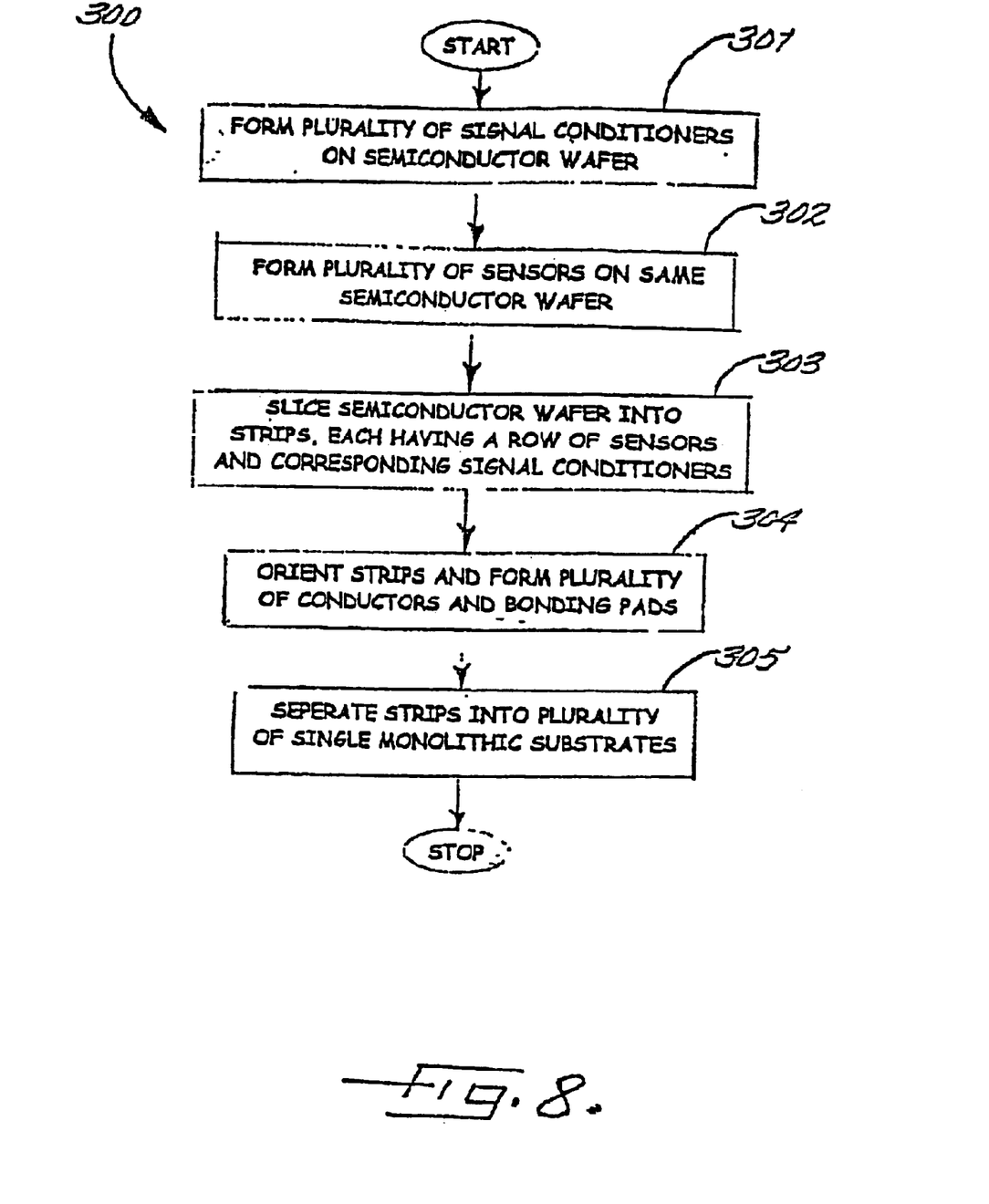
FIG. 8 is flow diagram of a method of forming a sensing apparatus according to the present invention.

FIG. 8 illustrates the method steps 300 for efficiently forming a plurality of compact sensing apparatuses. In this second method, a plurality of signal conditioners with bonding pads and conductors are formed on a single semiconductor wafer (Block 301). The plurality of signal conditioners are formed spaced apart from one another and are arranged substantially in a row along the semiconductor wafer on which each is formed. A plurality of sensors also are formed (Block 302), according to the method 300. Each of the sensors formed also are spaced apart and arrange in row-like fashion, each corresponding to one of the signal conditions formed on the same semiconductor wafer. Multiple rows of sensors and corresponding signal conditioners can be formed on the same wafer according to the method 300. The semiconductor wafer is sliced into strips, each having a row-arranged set of sensors and corresponding signal conditioners (Block 303). The strips are then arranged on edge and, on a cut plane of each strip, a plurality of bonding pads and conductors are formed (Block 304). The bonding pads and conductors formed on the cut plane will be part of the conductive paths that ultimately will be formed to electrically connect each sensor and corresponding signal conditioner as earlier described. Each strip is then separated into a plurality of single monolithic semiconductor substrates, each strip having formed thereon on a sensor, signal conditioner, conductors, and bonding pads (Block 305). Each monolithic substrate can then be formed into a compact sensing apparatus having a sensor and signal conditioner angled at a predetermined angle according to the methods described above.

Bonding Methods Using a Thermosetting Material

FIGS. 1A–6, as described in detail above, illustrate method aspects of the present invention for forming a compact sensing apparatus in which a sensor and corresponding signal conditioner are formed on a single monolithic semiconductor substrate and angled relative to each other at a predetermined angle. As described, the method essentially entails forming the sensor and signal conditioner on the substrate and then separating the substrate such that the sensor is formed on a sensor substrate and the corresponding signal conditioner is formed on a signal conditioner substrate. The sensor substrate and the signal conditioner substrate are oriented to position the sensor and the signal conditioner relative to each other at the predetermined angle. A monolithic substrate can then be reformed by structurally connecting the substrates. The sensor and signal conditioner are electrically connected via a conductive epoxy or similar thermosetting material.

A third method embodiment of the present invention for accomplishing this result, again, entails forming the sensor and signal conditioner on the same wafer surface of a substrate, as illustrated in FIGS. 1A–1C and 2A–2C. The single substrate is separated so as to form a sensor substrate and a signal conditioner substrate with the sensor formed on the sensor substrate and the signal conditioner formed on the signal conditioner substrate. Recessed channels are formed in the sensor substrate and the signal conditioner, which subsequently can be filled with a conductive epoxy to form a conductive path between the sensor and the signal conditioner. Specifically, at least one recessed channel is formed in the wafer surface of the signal conditioner substrate on which the signal conditioner is formed. The sensor substrate having the sensor formed also on a wafer surface is oriented so that at least one recessed channel can be formed in a cut plane of the senor substrate.

The sensor substrate and the signal conditioner substrate are then are oriented so that the at least one recessed channels on each substrate align with one another. Electrical conductors extending between the recessed channel on the sensor substrate and the sensor, as well as between the recessed channel on the signal conditioner substrate and the signal conditioner can now be formed on the respective substrates, or alternatively, are already formed thereon. Therefore, when the recessed channels are aligned, they can be filled with a conductive epoxy or other conductive thermosetting material thereby completing a conductive path between the sensor and the signal conditioner.

It is important to note that the order in which the steps are carried out can be varied. The recessed channels can be formed prior to separation of the single monolithic substrate into a sensor substrate and signal conditioner substrate. Indeed, the recessed channels can be formed on the substrate prior to formation of the sensor and the signal conditioner. Alternatively, as described above, the recessed channels can be formed after the single monolithic substrate is separated into a sensor substrate and signal conditioner substrate but prior to joining the substrates to reform a monolithic substrate having the sensor and signal conditioner oriented at a predetermined angle. As alluded to above, the electrical conductors can be formed at various points in the process as well.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

What is claimed is:

1. A compact sensing apparatus comprising:
   a signal conditioner semiconductor substrate;
   a sensor semiconductor substrate having a first surface thereof abuttingly connected to a first surface of the signal conditioner substrate;
   a signal conditioner circuit formed on a second surface of the signal conditioner semiconductor substrate for conditioning a sensing signal; and
   a sensor circuit formed on a second surface of the sensor semiconductor substrate and electrically connected to the signal conditioner circuit for generating the sensing signal in response to a predetermined physical stimulus, wherein the second surface of the sensor semiconductor substrate is orthogonal to the second surface of the signal conditioner semiconductor substrate, wherein the sensor circuit and the signal conditioner circuit are electrically connected via a conductive thermosetting material diffused into at least one recessed channel formed in the surface of the sensor substrate and into at least one channel formed in the surface of the signal conditioner substrate, the at least one recessed channel of the sensor substrate and the signal conditioner substrate being aligned to thereby provide a common channel bridging the sensor and the signal conditioner substrates for providing a conductive path between the sensor and the signal conditioner.

2. A compact sensing apparatus as defined in claim 1, wherein the sensor substrate and the signal conditioner substrate are abuttingly connected by mutual adhesion, the adhesion being effected by a nonconductive thermosetting material positioned between the mutually abutting surface portions of the sensor substrate and the signal conditioner substrate.

3. A compact sensing apparatus as defined in claim 1, the apparatus further comprising a base on which the signal conditioner substrate is mounted and conducting means for providing an electrical connection between the sensing apparatus and a preselected electrical device.

4. A compact sensing apparatus as defined in claim 3, wherein the conducting means comprises at least one bonding pad positioned on the signal conditioner substrate for providing an electrical connection with an electrical conductor having a first end connected to the at least one bonding pad and a second end connected to a preselected electrical device to thereby provide a conductive path between the sensing apparatus and the preselected electrical device.

5. A compact sensing apparatus as defined in claim 4, the apparatus further comprising an encapsulation surrounding at least a portion of the sensor and the base-mounted signal conditioner.

6. A compact sensing apparatus as defined in claim 5, wherein the base comprises a roughened surface portion which contacts a portion of and to increase friction at points of contact between the base and the encapsulation to thereby reduce the probability that the base and the encapsulation will separate from each other.

7. A compact sensing apparatus as defined in claim 5, wherein the base comprises at least one recessed well within a surface portion of the base to increase the extent of contact between the base and the encapsulation to thereby reduce the probability that the base and the encapsulation will separate from each other.

8. A compact sensing apparatus as defined in claim 1, wherein the sensor circuit and the signal conditioner circuit are electrically connected by at least one bonding pad positioned on the sensor substrate and at least one bonding pad positioned on the signal conditioner substrate.

9. A compact sensing apparatus as defined in claim 8, the apparatus further comprising a base on which the signal conditioner substrate is mounted and conducting means for providing an electrical connection between the sensing apparatus and a preselected electrical device.

10. A compact sensing apparatus as defined in claim 9, wherein the conducting means comprises at least one bonding pad positioned on the signal conditioner substrate for providing an electrical connection with an electrical conductor having a first end connected to the at least one bonding pad and a second end connected to a preselected electrical device to thereby provide a conductive path between the sensing apparatus and the preselected electrical device.

11. A compact sensing apparatus as defined in claim 10, the apparatus further comprising an encapsulation surrounding at least a portion of the sensor and the base-mounted signal conditioner.

12. A compact sensing apparatus as defined in claim 11, wherein the base comprises a roughened surface portion which contacts a portion of and to increase friction at points of contact between the base and the encapsulation to thereby reduce the probability that the base and the encapsulation will separate from each other.

13. A compact sensing apparatus as defined in claim 11, wherein the base comprises at least one recessed well within a surface portion of the base to increase the extent of contact between the base and the encapsulation to thereby reduce the probability that the base and the encapsulation will separate from each other.

14. A compact sensing apparatus as defined in claim 1, wherein the signal conditioner semiconductor substrate and the sensor semiconductor substrate are formed from the same semiconductor substrate material.

* * * * *